United States Patent Office.

ISAIAH L. ROBERTS AND HENRY L. BREVOORT, OF BROOKLYN, NEW YORK.

DISINFECTANT.

SPECIFICATION forming part of Letters Patent No. 406,062, dated July 2, 1889.

Application filed March 3, 1888. Serial No. 266,032. (No specimens.)

*To all whom it may concern:*

Be it known that we, ISAIAH L. ROBERTS and HENRY L. BREVOORT, citizens of the United States, both residents of the city of Brooklyn, county of Kings, and State of New York, have invented a new and useful Improvement in Disinfectants, of which the following is a specification.

Our invention relates to substances to be used in water-closets, urinals, sinks, or other places from which a disagreeable odor may arise, for the purpose of disinfecting the same.

The article about to be described is more especially intended for use in places where there is a flow of some liquid—such as water, &c.—either intermittent or steady, although we prefer to have it used where the flow is intermittent.

It has long been known that permanganate or bichromate of potash or soda would act as a disinfecting agent or agents. The use of these substances for such purposes has been extensive, the reason being that their action was certain and that they operated on correct principles. The operation of such substances is as follows: Large amounts of oxygen are carried by chemicals of this class, and when they are brought into contact with dead organic substances they at once oxidize such substances and thus render them harmless. The use of such substances in urinals and water-closets has not become general on account of the great solubility of the materials. They had to be used in the liquid form, and this fact has, in a great measure, limited their sphere of usefulness.

Our invention is designed to enable such substances as we have before referred to to be handled as a solid and be used as such in the situations which we have enumerated.

We proceed as follows in the practice of our invention: We take plaster-of-paris, preferably, and while in the powdered condition we mix with it the disinfecting substance, also in the condition, preferably, of a powder. Though we prefer permanganate of potash, other like substances can be beneficially employed—such as permanganate or bichromate of soda, or the like. We may use equal parts, by weight, of the permanganate and the plaster, or less permangate may be employed, this depending upon the desires of the person making the compound and the strength which it is desired the mixture should possess. When the powders are thoroughly mixed, we add water to them in the same way in which any one would proceed if plaster were to be made. After the ingredients have thus been mixed and the water has been added we pour the semi-fluid mass into molds of any desired shape and let it set, as is usual with plaster-of-paris. When set, the hardened cakes are taken from the molds and are ready for use.

In the urinal, for example, we merely place the cake in the basin that receives the water and leave it there. Any water falling on these cakes will dissolve out a small quantity of the permanganate, which is carried down the drainage-pipes, and will oxidize any putrid matter contained therein. The plaster being porous holds the very soluble disinfectant so that but little of it is used up at each use of the basin. Plaster is itself slightly soluble, and therefore does not stop up the pipes. The amount of plaster which is washed into the pipes is, however, small, being due chiefly to the attrition of the stream of water directed against the cake. After use the cake remains wet, and some of the permanganate from the interior of the cake finds its way to the exterior of the mass and there remains to be washed out by the stream of water. Thus the cake acts to hold the very soluble disinfecting material and to prevent its too rapid use, while it permits enough to be washed from it each time to keep the basin sweet.

The cakes of plaster can be made and then they can be soaked in a strong solution of permanganate till thoroughly impregnated with it; but this method we do not advise. By having the plaster more or less finely ground the cake can be made more or less porous, and in this way varying situations may be provided for.

If our cakes are used in a water-closet, then a suitable holder must be provided for them which will hold the cake in the stream of inflowing water. Our cakes are of most use in urinals, and for this use they are specially designed.

Asbestus and similar unoxidizable substances might be used with the plaster-of-paris.

We do not confine ourselves to plaster-of-paris as a holder, for porous-clay cylinders or receptacles may be filled with the crystals and sealed up, which would act as well. These cylinders may be refilled when exhausted. The clay receptacles should be baked, so as to be insoluble in acids, the same as are used in electrical batteries.

What we claim, and desire to secure by Letters Patent, is—

1. As a new article of manufacture, a disinfectant-block composed of plaster-of-paris and permanganate of potash, substantially as described.

2. As a new article of manufacture, a disinfectant composed of plaster-of-paris and asbestus and a permanganate, substantially as described.

Signed at the city, county, and State of New York this 29th day of February, 1888.

ISAIAH L. ROBERTS.
HENRY L. BREVOORT.

Witnesses:
JOSEPH L. LEVY,
M. E. STODDARD.